No. 821,980. PATENTED MAY 29, 1906.
N. H. BLOOM.
RIDING ATTACHMENT FOR AGRICULTURAL IMPLEMENTS.
APPLICATION FILED JULY 25, 1905.
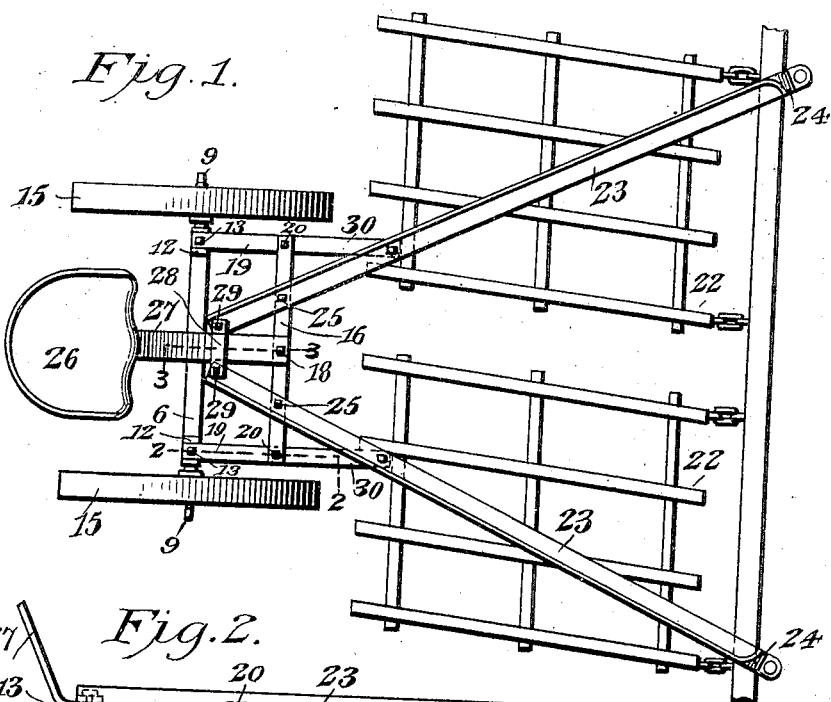
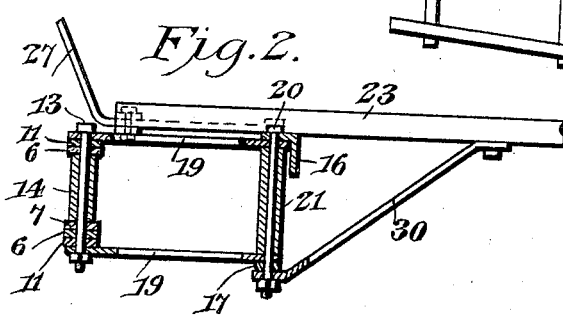
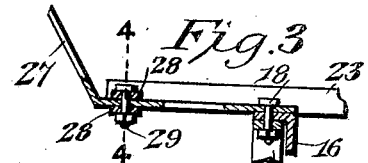
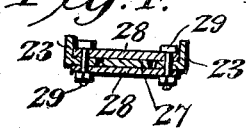
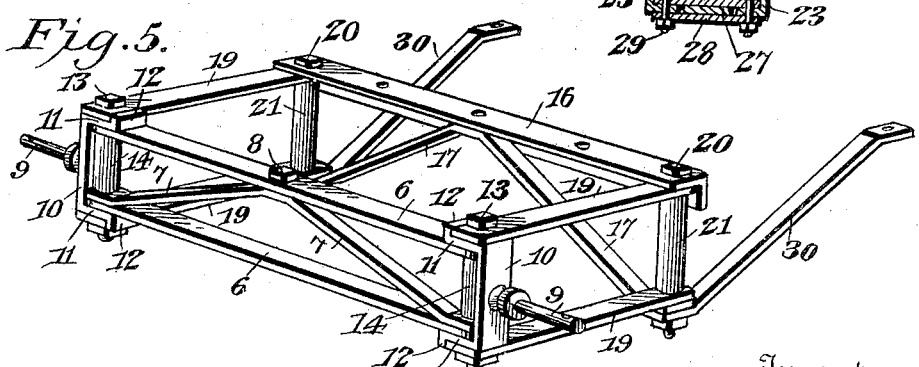

UNITED STATES PATENT OFFICE.

NICKLAS H. BLOOM, OF NASHUA, IOWA.

RIDING ATTACHMENT FOR AGRICULTURAL IMPLEMENTS.

No. 821,980.  Specification of Letters Patent.  Patented May 29, 1906.

Application filed July 25, 1905. Serial No. 271,211.

*To all whom it may concern:*

Be it known that I, NICKLAS H. BLOOM, a citizen of the United States, residing at Nashua, in the county of Chickasaw and State of Iowa, have invented a new and useful Riding Attachment for Agricultural Implements, of which the following is a specification.

The present invention relates to riding attachments of the type described in several prior patents granted to me.

The principal object in the present case is to provide a simple structure of a novel nature which may be readily connected to a harrow or other implement and will properly trail behind the same and, furthermore, is so constructed that the wheels will be automatically, positively, and properly deflected or cramped when the implement is turned without binding or slipping action.

The preferred embodiment of the invention is illustrated in the accompanying drawings, wherein—

Figure 1 is a top plan view of the structure, showing the same connected to a harrow. Fig. 2 is a detail sectional view on an enlarged scale and substantially on the line 2 2 of Fig. 1. Fig. 3 is a sectional view on the line 3 3 of Fig. 1. Fig. 4 is a cross-sectional view on the line 4 4 of Fig. 3. Fig. 5 is a perspective view of the attachment.

Similar reference-numerals designate corresponding parts in all the figures of the drawings.

In the embodiment illustrated an axle is employed made up of spaced transverse bars 6, reinforced by a strut-brace 7, connected at its central portion by a bolt 8 to the upper bar and having its ends located upon the ends of the lower bar. Pivotally associated with the axle are wheel-carriers in the form of spindles 9, said spindles projecting outwardly from and being carried by the central portion of upright straps 10, said straps having offset ears 11 overlapping the ends of the bars 6, the free terminals of said ears being outwardly turned, as shown at 12, and forming stops. Bolts 13 pass through the ears 11, the ends of the bars 6, the ends of the brace 7, and through spacing-sleeves 14, interposed between the upper bar 6 and the ends of the brace 7. On these bolts the spindles 9 are capable of swinging. Said spindles carry suitable wheels 15.

Associated with the axle-frame and spindles is a supporting-frame comprising transversely-disposed bars, the upper being designated 16 and being preferably of angle-iron, the lower consisting of a brace 17, connected at its central portion to the central portion of the bar 16 by a bolt 18, the ends of the brace 17 being spaced from the ends of the bar 16. This supporting-frame is connected at its ends to the ends of the axle by means of swinging links 19, which links are connected at their front ends to the supporting-frame by means of upright bolts 20, that permit the pivotal movements of said links with respect to the supporting-frame, the bolts passing through sleeves 21, interposed between the bar 16 and the brace 17. The rear ends of the links, as clearly shown in Fig. 5, are interlocked with the ears 11 of the wheel-spindles by means of the stop hook-lugs 12, the bolts 13 passing through the rear ends of said links.
Thus it will be seen that while the links have pivotal movements with respect to the axle they are held against relative movement with respect to the spindles. In other words, said spindles will swing with the links.

The means for connecting the structure to an implement—as, for instance, a harrow 22—consists of a reach that is composed of divergently-disposed angle-bars 23, the front ends of which are downturned, as illustrated at 24, and are adapted to be suitably connected to the harrow. The rear portions of the reach-bars 23 are bolted, as shown at 25, to the cross-bar 16 of the supporting-frame. The rear ends of said reach-bars extend in rear of the cross-bar and are entirely separate from the axle. A suitable seat 26 is provided with a standard 27, the lower portion of which is disposed between the rear ends of the reach-bars 23, to which it is clamped by holding-plates 28, bolted, as shown at 29, to the reach-bars. The front end of the standard 27 is secured to the central portion of the supporting-frame 16 by the bolt 18. The ends of the supporting-frame are connected to the reach-bars 23 by braces 30, which braces are secured at their rear ends by the bolts 20, their front ends being suitably attached to the reach-bars in advance of the supporting-frame.

It will be apparent that the structure can be readily applied to a harrow or other agricultural implement by merely fastening the front ends of the reach-bars thereto. When so connected, the riding attachment will properly trail behind the implement, and when making a turn the reach-bars will be swung, thereby moving the supporting-frame to one side, consequently swinging the links 19 and causing the spindles 9 to turn in opposite directions, thus deflecting or cramping the wheels and causing the structure to properly follow the harrow, without any binding or slipping action. The attachment is thus peculiarly applicable to agricultural machines, as it insures the proper position of the rider with respect to the said machine at all times, the deflection of the wheels being automatically and positively effected with every turn of the implement.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a riding attachment of the character described, the combination with a support including wheel-spindles movable in opposite directions, of means for connecting the support to an implement, said means effecting the said movements of the spindles when the implement is turned, and a seat mounted on the connecting means and movable laterally with the same.

2. In a riding attachment of the character described, the combination with a supporting-frame, of separate wheel-spindles pivoted thereto, means for connecting the frame to an implement and effecting the pivotal movements of the spindles, and a seat mounted on and movable with the connecting means.

3. In a riding attachment of the character described, the combination with a support including an axle, of wheel-spindles separately pivoted thereto, means for connecting the support to an implement and effecting the pivotal movements of the spindles, and a seat carried by and swinging with the said connecting means.

4. In a riding attachment of the character described, the combination with separately-movable wheel-spindles, of wheels journaled thereupon, a reach for connection with the implement, said reach having connections with the spindles for effecting their pivotal movements, and a seat supported on and swinging with the reach.

5. In a riding attachment of the character described, the combination with a supporting-frame, of wheel-carriers movably mounted thereon and movable in opposite directions, means for effecting the opposite movements of the wheel-carriers, said means including a reach for attachment to an implement, and a seat rigidly affixed to the reach and movable therewith.

6. In a riding attachment of the character described, the combination with a supporting-frame, of wheel-spindles pivoted to the opposite side portions thereof, and means for effecting the pivotal movements of the spindles, said means including a reach for attachment to an implement, and a seat rigidly affixed to the said means and being movable therewith and with the spindles.

7. In a riding attachment of the character described, the combination with an axle, of wheel-spindles pivoted to the axle, a seat-support connected to the spindles and movable therewith, and means for connecting the seat-support to an implement.

8. In a riding attachment of the character described, the combination with an axle, of a seat-supporting frame having pivotal connection with the axle, wheel-spindles pivoted to the axle and movable with the seat-supporting frame, and means for connecting the seat-supporting frame to an implement.

9. In a riding attachment of the character described, the combination with connected pivotal wheel-carriers, of a seat-support, link connections between the carriers and seat-support, and means for connecting the structure to an implement.

10. In a riding attachment of the character described, the combination with an axle comprising a frame, of wheel-spindles pivoted thereto, a seat-supporting frame, links pivotally connecting the frame and interlocked with the spindles, and reach-bars connected to the seat-supporting frame.

11. In a riding attachment of the character described, the combination with an axle, of wheel-spindles movable with respect thereto, means for effecting the movement of the spindles, said means being pivoted to the axle, and a seat carried by the said means and swinging therewith and thus with respect to the axle.

12. In a riding attachment of the character described, the combination with an axle, of a seat-support, links pivotally connecting the axle and seat-support, and means for connecting the same to an implement.

13. In a riding attachment of the character described, the combination with an axle, of wheel-spindles connected thereto, a seat-support, and links pivotally connecting the axle and seat-support, said links and wheel-spindles being held against relative movement.

14. In a riding attachment of the character described, the combination with an axle, of a wheel-spindle pivoted thereto and projecting beyond one end of the same, a reach having connections with the spindle for holding it in projected relation and effecting its pivotal movement, and a seat carried by the reach and swinging therewith.

15. In a riding attachment of the character described, the combination with a frame, of an axle, a wheel-spindle pivoted to the axle and projecting beyond the same, a reach, means connected to the reach and having an interlocked connection with the spindle for holding it in projecting relation and effecting its pivotal movement, and a seat swinging with the reach and spindle.

16. In a riding attachment of the character described, the combination with a frame, of a wheel-spindle having spaced connections pivotally connected to the frame, and means for connecting the frame to an implement, said means having spaced connections with the spindle for determining the position of the same with respect to the frame.

17. In a riding attachment of the character described, the combination with a frame including spaced bars, of a wheel-spindle having spaced ears pivotally connected to the spaced bars of the frame, and means for connecting the frame to an implement, said means being interlocked with the spaced ears of the spindle for determining the position of the spindle with respect to the frame.

18. In a riding attachment of the character described, the combination with an axle-frame, of spindles projecting beyond opposite ends thereof and having uprights at their inner ends that are provided with ears, said ears being pivotally connected to the ends of the axle, and means for connecting the frame to an implement, said means being also connected to the ears of the axle-spindles.

19. In a riding attachment of the character described, the combination with an axle-frame including upper and lower bars, of wheel-spindles having uprights provided with offset ears overlapping the ends of the bars, sleeves interposed between the ends of the bars, bolts passing through the bars, the ears, and sleeves, and means for connecting the axle to an implement, said means including links having connections with the spindles.

20. In a riding attachment of the character described, the combination with an axle, of wheels carried by the opposite portions thereof, a seat-supporting frame having pivotal connections with the axle, a seat mounted on the frame and movable therewith, and means for connecting the frame to an implement.

21. In a riding attachment of the character described, the combination with an axle, of wheels carried by the opposite portions thereof, a seat-supporting frame, links pivoted to the axle and to the frame, and reach-bars connected to the frame.

22. In a riding attachment of the character described, the combination with an axle, of wheels carried by the opposite portions thereof, a seat-supporting frame, links pivoted to the axle and to the frame, reach-bars connected to the frame, and a seat connected to the reach-bars and frame.

23. In a riding attachment of the character described, the combination with an axle, of wheels carried by the opposite portions thereof, a seat-supporting frame, links pivoted to the ends of the axle and to the ends of the frame, reach-bars connected to the frame and extending in rear of the same between the links, and a seat having a standard secured to the rear ends of the reach-bars.

24. In a riding attachment of the character described, the combination with a supporting-frame comprising transverse bars, of an axle-frame having transverse bars, links connecting the corresponding ends of the frames, upright bolts passing through the frame-bars and links, spindles connected to and movable with the links, said spindles being associated with the axle, and reach-bars connected to the supporting-frame.

25. In a riding attachment of the character described, the combination with a supporting-frame comprising transverse bars having intermediate portions secured together, of upright bolts connecting the ends of the bars, sleeves located on the bolts, swinging links mounted on the bolts, an axle-frame disposed in rear of the supporting-frame and comprising transverse bars having a brace between them, wheel-spindles having uprights provided with offset ears interlocked with the rear ends of the links, upright bolts passing through the links, the connections, and the axle-bars, divergently-disposed reach-bars secured to the supporting-frame and extending in rear of the same, and a seat having a standard connected to the rear ends of the reach-bars and to the supporting-frame.

26. In a riding attachment of the character described, the combination with a support including an axle and wheel-spindles connected thereto and movable in opposite directions, of means for connecting the support to an implement and turning the spindles, and a seat mounted on the connecting means independently of the axle and turning with said connecting means.

27. In a riding attachment of the character described, the combination with a support including an axle and wheel-spindles pivoted thereto and movable in opposite directions, of means for connecting the support to an implement and turning the spindles, a seat-standard mounted on the connecting means and extending in rear of the axle, and a seat mounted on the rearwardly-extending end.

28. In a riding attachment of the character described, the combination with a support including an axle and wheel-spindles connected thereto and movable in opposite directions, of a cross-bar connected to the spindles, a reach connected to the cross-bar and extending in rear of the same, said reach having its rear end separate from and independent of the axle, a seat-standard mounted on said rear end of the reach, and a seat carried by the standard.

In testimony that I claim the foregoing as my own I have hereto affixed my signature in the presence of two witnesses.

NICKLAS H. BLOOM.

Witnesses:
H. A. FANGMAN,
ANDREW EVALD.